Dec. 25, 1945.　　　　T. H. DUNN　　　　2,391,622
DRILLING MUD
Filed Feb. 29, 1944　　　　2 Sheets-Sheet 1

Inventor:
Thomas H. Dunn
By: Youart H. Kerslake
Attorney.

Patented Dec. 25, 1945

2,391,622

UNITED STATES PATENT OFFICE 2,391,622

DRILLING MUD

Thomas H. Dunn, Tulsa, Okla., assignor to Stanolind Oil and Gas Company, Tulsa, Okla., a corporation of Delaware Application February 29, 1944, Serial No. 524,453

10 Claims. (Cl. 252—8.5)

The present invention relates to drilling muds and particularly to those drilling muds which contain starch or the like for improving the colloidal properties of the mud.

In the past it has been common practice to add certain substances to drilling mud in order to improve the colloidal characteristics of the mud, which not only enhance the ability of the mud to remove cuttings from the well but also improve the ability of the drilling mud to seal off the walls of the well, thereby preventing the loss of water from the drill mud to the formations. A substance which has been used for this purpose is bentonite. However, whenever a salt formation or a formation producing salt water is encountered during drilling the drill mud is contaminated with the brine, the colloidal material flocculates and all of the above enumerated advantages of the colloidal material are lost. In order to provide a drilling mud which does not lose its colloidal characteristics when salt water is encountered, it has been proposed to add starch to the drilling mud. The colloidal characteristics imparted to the drilling mud by the starch are not lost when a salt water bearing formation is encountered. However, when the drilling mud has a pH value of approximately 8 and lower, it is found that the starch in the drilling mud will ferment in a relatively short time and the colloidal characteristics thereof will be lost. When the pH value of the drilling mud is maintained at a much higher value, for instance, approximately 11 or higher, the fermentation of the starch in the drilling mud is prevented.

It is found that drilling muds containing salt nearly always contain calcium as well and, in general, the calcium content is somewhat proportional to the total salt content.

I have discovered that drilling muds containing dissolved calcium salts and to which mud starch has been added undergo a serious disadvantage when the mud has a pH value of about 10 and higher and particularly when the pH value is between 11 and 13. The disadvantage is that large quantities of the water in the drilling mud is lost to the formation. The unusual increase in water loss is due to the presence of calcium ions in the drilling mud. If the calcium ions are precipitated out as a highly insoluble calcium salt such as calcium carbonate, then the serious water loss occurring between the pH values of 11 and 13 is overcome.

Figure 1:
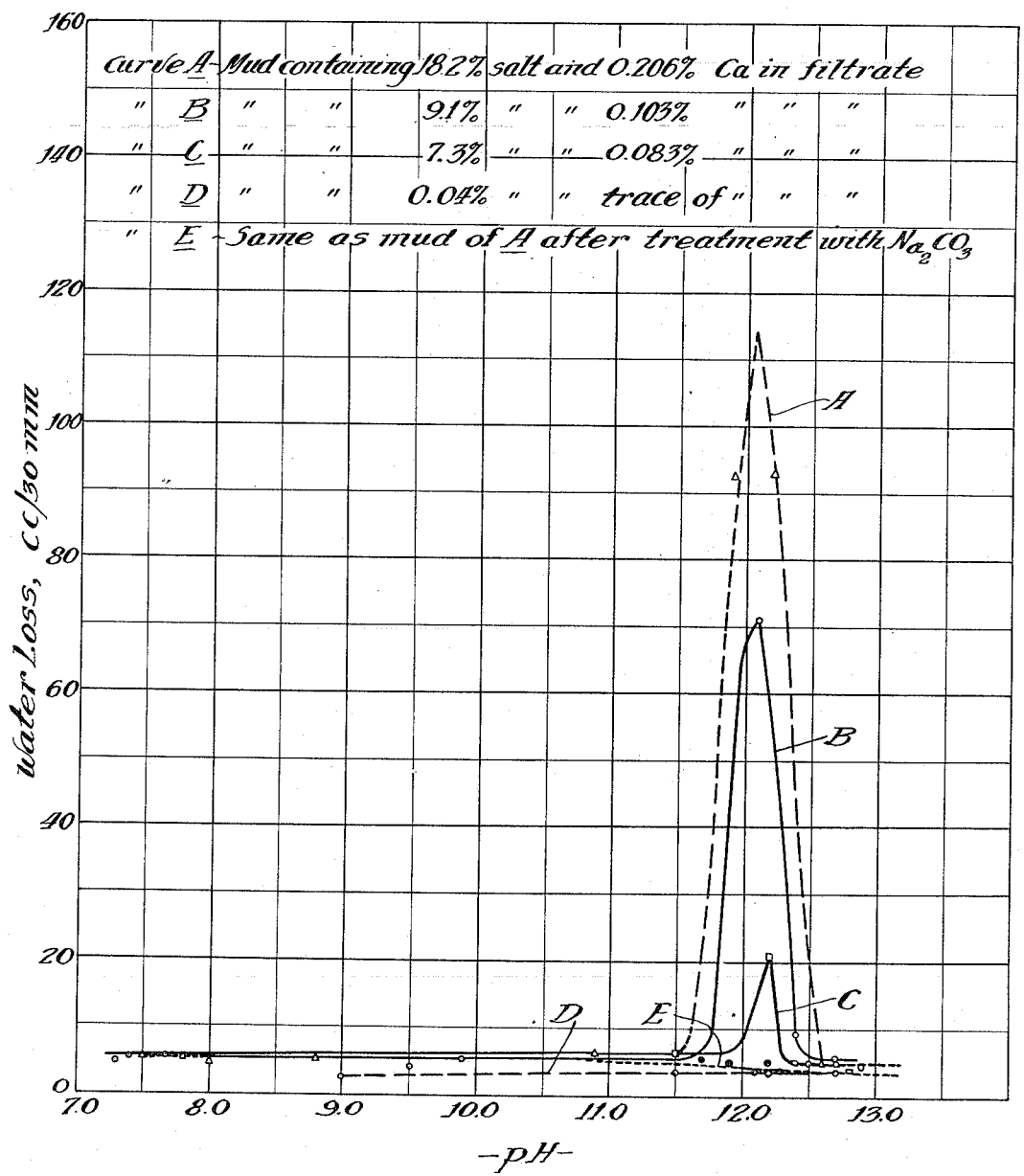
Figure 2:
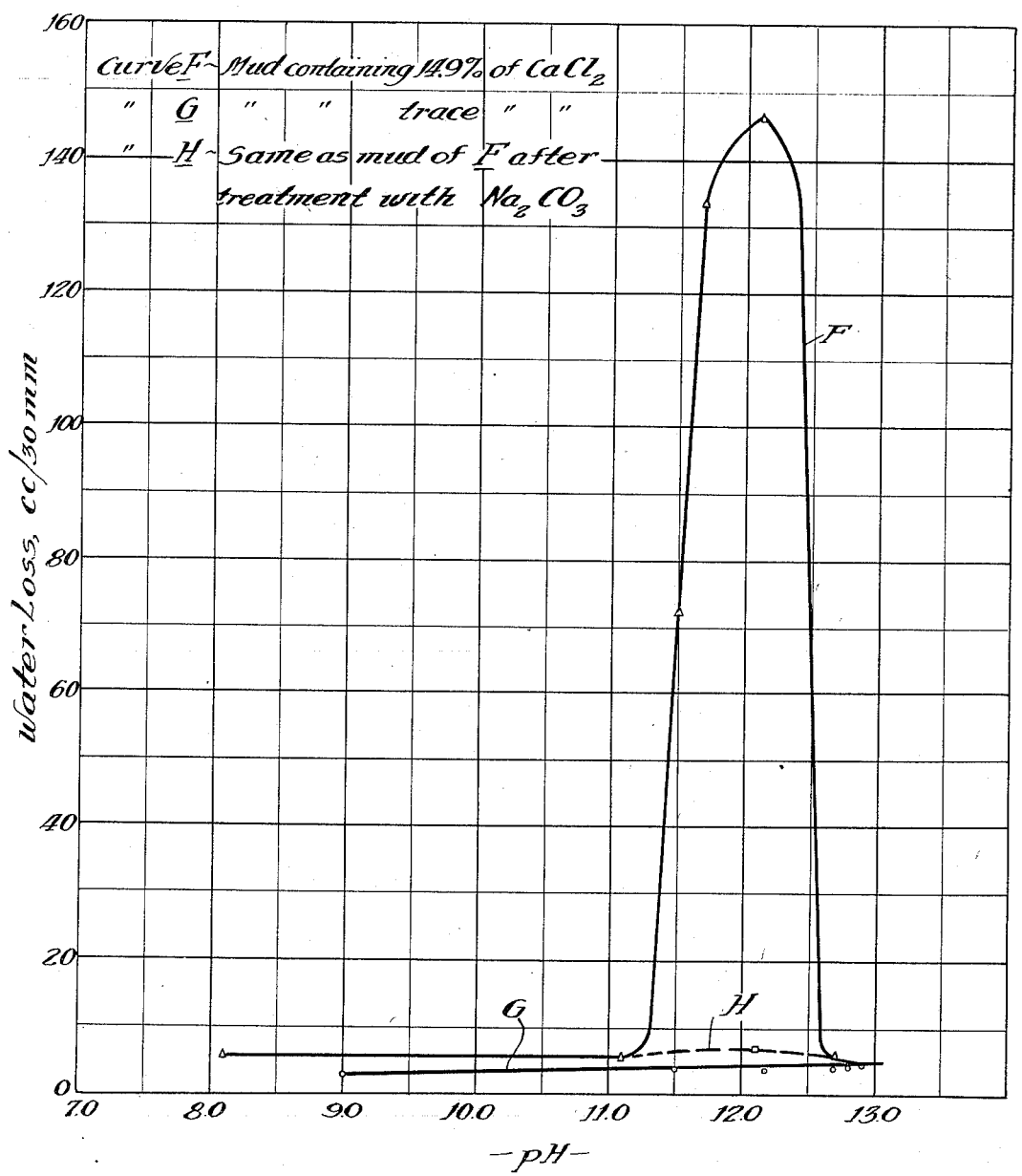

With reference to the drawings which form a part of this specification, Figure 1 is a chart illustrating the excessive water loss of starch-containing drilling muds of varying salt and calcium ion contents at varying pH values and Figure 2 shows the effect of calcium ions upon the water loss of a starch-containing mud having various pH values.

With particular reference to Figure 1, it will be noted that the water loss of a mud having a pH value between about 11 and 13 decreases as the salt water content and consequently the calcium ion content of the mud decreases. Line A of Figure 1 represents a mud containing 18.2% by weight of salt and 0.206% by weight of calcium in the mud filtrate, while line B represents a mud containing 9.1% of salt and 0.103% of calcium in the mud filtrate. Line C represents a mud which contains 7.3% of salt and 0.083% of calcium in the mud filtrate. A mud containing 0.04% of salt and a trace of calcium is represented by line D. Each of the muds represented by lines A, B, C and D contain seven pounds of starch per barrel of mud and caustic soda in the form of a 40% solution to vary the pH value of the mud. This chart is clear evidence that the ability of the mud to seal the walls of a well is seriously affected by increased amounts of calcium in the mud. This effect may be due to a chemical reaction occurring between the starch and calcium or possibly excessive dispersion of the starch by the calcium at the particular high pH range.

With further reference to Figure 1, the mud shown by line E is the same as that shown in line A with the exception that it has been treated with a slight excess of sodium carbonate, i. e., an amount sufficient to precipitate all of the calcium present. The resulting mud has greatly reduced water loss characteristics. For example, when the natural field mud represented by line A and containing 0.206% calcium in the filtrate has a pH value of 11.9, the water loss is 94 cc. per thirty minutes, whereas when the same mud has been treated with sodium carbonate the water loss, under the same test conditions, is 5 cc. per thirty minutes.

With reference to Figure 2, the mud shown by line F contains 14.9% calcium chloride based on the total mud weight plus seven pounds of starch per barrel of mud and 40% caustic soda solution. The mud illustrated by line G has exactly the same composition as the mud of line F with the exception that only a trace of calcium chloride is present. In order to remove the calcium ions which are contained in a drilling mud, it is necessary to add to the drilling mud a compound which will form a highly insoluble salt with the calcium ions so that they will precipitate out in the mud pits. Since calcium carbonate, calcium phosphates and calcium oxalate are completely insoluble in water or are only very slightly soluble in water, only a trace of the calcium ion will be present.

The compound for precipitating the calcium ion may, therefore, be sodium carbonate (soda ash), sodium phosphate or sodium oxalate. Obviously, other alkali metal and ammonium salts which will precipitate the calcium from drilling mud may be used. When sodium or potassium salts are used to precipitate the calcium, the presence of these ions tends to maintain or increase the pH value of the drilling mud so that there is no danger of the pH value becoming lower whereby the starch in the drilling mud would ferment. For purely economical reasons, we prefer to use sodium carbonate, since the resulting calcium carbonate is practically insoluble in the drilling mud and will settle out very easily in the mud pits and the cost of the sodium carbonate is very low. For example, a mud which contains about 2060 parts per million of calcium requires approximately two pounds of sodium carbonate per barrel of mud in order to precipitate out all of the calcium. While a partial or a substantial precipitation of the calcium present will give improved results insofar as water loss is concerned, it is necessary to precipitate the calcium completely in the form of insoluble calcium salt in order to entirely eliminate the detrimental effect of the calcium ion on the water loss of starch treated mud having a pH value between about 11 and 13. In general it is preferable to form calcium salt whose solubility in water at atmospheric temperatures (60°–100° F.) is less than 0.09 gram per liter or .009% by weight.

With further reference to Figure 2, the mud shown by line H is the same as that shown in line F with the exception that it has been treated with a slight excess of sodium carbonate, i. e., an amount sufficient to precipitate all of the calcium present. The resulting mud has greatly reduced water loss characteristics. For example, when the mud represented by line F and containing 14.9% calcium chloride based on the weight of the total mud has a pH value of 12, the water loss is approximately 156 cc. per thirty minutes, whereas when the same mud has been treated with sodium carbonate (line H) the water loss, under the same test conditions, is approximately 7 cc. per thirty minutes. The water loss characteristics of the treated mud are substantially the same as the mud represented by line G which contains only a trace of calcium chloride.

Although I have described my invention with particular reference to the several examples, it will be understood that I do not intend to be limited by these examples and that my invention extends to all modifications of the invention which would occur to one skilled in the art.

Having now described my invention what I claim is:

1. A compounded aqueous drilling mud having a pH value of at least 10 and suitable for use in brine-producing wells comprising an aqueous drilling mud, starch, and a basic substance capable of reacting with calcium ions to form an insoluble salt, said basic substance being added in an amount sufficient to react with a substantial portion of the calcium ions which are encountered during drilling whereby excessive water loss is overcome.

2. A compounded aqueous drilling mud having a pH value of at least 10 and suitable for use in brine-producing wells comprising an aqueous drilling mud, starch, and an alkaline salt capable of reacting with calcium ions to form a salt whose solubility in water at atmospheric temperature is less than 0.009 per cent by weight, said alkaline salt being added in an amount sufficient to react with a substantial portion of the calcium ions which are encountered during drilling whereby excessive water loss is overcome.

3. A compounded aqueous drilling mud having a pH value of at least 10 and suitable for use in brine-producing wells comprising an aqueous drilling mud, starch, and a water-soluble alkali metal carbonate capable of reacting with calcium ions to form an insoluble salt, said alkali metal carbonate being added in an amount sufficient to react with a substantial portion of the calcium ions which are encountered during drilling whereby excessive water loss is overcome.

4. A compounded aqueous drilling mud having a pH value of at least 10 and suitable for use in brine-producing wells comprising an aqueous drilling mud, starch, and a water-soluble alkali metal oxalate capable of reacting with calcium ions to form an insoluble salt, said alkali metal oxalate being added in an amount sufficient to react with a substantial portion of the calcium ions which are encountered during drilling whereby excessive water loss is overcome.

5. A compounded aqueous drilling mud having a pH value of at least 10 and suitable for use in brine-producing wells comprising an aqueous drilling mud, starch, and a water-soluble alkali metal phosphate capable of reacting with calcium ions to form an insoluble salt, said alkali metal phosphate being added in an amount sufficient to react with a substantial portion of the calcium ions which are encountered during drilling whereby excessive water loss is overcome.

6. A compounded aqueous drilling mud having a pH value of at least 10 and suitable for use in brine-producing wells comprising an aqueous drilling mud, starch, and sodium carbonate capable of reacting with calcium ions to form an insoluble salt, said sodium carbonate being added in an amount sufficient to react with a substantial portion of the calcium ions which are encountered during drilling whereby excessive water loss is overcome.

7. A method of improving the well-sealing properties of an aqueous drilling mud when calcium ions are encountered during drilling, said mud containing starch and having a pH value of at least 10 comprising adding to the mud, when said calcium ions are encountered, a compound capable of forming an insoluble salt with said calcium ions, said compound being added in an amount sufficient to react with a substantial portion of said calcium ions whereby excessive water loss is overcome.

8. A method of improving the well-sealing properties of an aqueous drilling mud when calcium ions are encountered during drilling, said mud containing starch and having a pH value of at least 10 comprising adding to the mud, when said calcium ions are encountered, an alkaline salt capable of forming an insoluble salt with said calcium ions, said alkaline salt being added in an amount sufficient to react with a substantial portion of said calcium ions whereby excessive water loss is overcome.

9. A method of improving the well-sealing properties of an aqueous drilling mud when calcium ions are encountered during drilling, said mud containing starch and having a pH value of at least 10 comprising adding to the mud, when said calcium ions are encountered, a water-soluble alkali metal carbonate capable of forming an insoluble salt with said calcium ions, said water-soluble alkali metal carbonate being added in an amount sufficient to react with a substantial portion of said calcium ions whereby excessive water loss is overcome.

10. A method of improving the well-sealing properties of an aqueous drilling mud when calcium ions are encountered during drilling, said mud containing starch and having a pH value of at least 10 comprising adding to the mud, when said calcium ions are encountered, sodium carbonate for forming an insoluble salt with said calcium ions, said sodium carbonate being added in an amount sufficient to react with a substantial portion of said calcium ions whereby excessive water loss is overcome.

THOMAS H. DUNN.